United States Patent [19]

Smolin et al.

[11] 4,442,222

[45] Apr. 10, 1984

[54] ADSORBENT FOR SEPARATION OF PARA-XYLENE

[75] Inventors: William Smolin, Fishkill; John H. Estes, Wappingers Falls, both of N.Y.

[73] Assignee: Texaco Inc., White Plains, N.Y.

[21] Appl. No.: 395,384

[22] Filed: Jul. 6, 1982

[51] Int. Cl.$^3$ .............................................. B01J 29/06
[52] U.S. Cl. ...................................... 502/60; 423/112
[58] Field of Search ................... 252/455 Z; 585/828; 423/112

[56] References Cited

U.S. PATENT DOCUMENTS 3,960,774  6/1976  Rosback .................... 252/455 Z
4,029,717  6/1977  Henly et al. .................. 585/828
4,289,740  9/1981  Estes .............................. 423/328

Primary Examiner—Carl F. Dees
Attorney, Agent, or Firm—Carl G. Ries; Robert A. Kulason; Carl G. Seutter

[57] ABSTRACT

Para-xylene may be separated as extract product by contacting charge C-8 aromatic hydrocarbon mixture with a synthetic crystalline barium or barium/potassium aluminosilicate zeolite HP, formed by ion exchange from a sodium aluminosilicate zeolite HP having a lattice constant of 25.02–25.10 Å and a ratio of silicon atoms to aluminum atoms of less than 1.0.

8 Claims, 1 Drawing Figure

ADSORBENT FOR SEPARATION OF PARA-XYLENE

FIELD OF THE INVENTION

This invention relates to solid-bed adsorptive separation. More particularly, it relates to the separation of p-xylene from C-8 aromatic hydrocarbon streams as a most strongly adsorbed, or tail end/extract product.

DESCRIPTION OF THE PRIOR ART

Solid bed adsorption techniques have been used to separate individual hydrocarbon isomers from charge hydrocarbon streams typified by C-8 aromatic streams containing ethylbenzene and xylene isomers.

Separation of para-xylene from other charge streams has been described in U.S. patents including:

| | | |
|---|---|---|
| 3,558,730 | 3,686,342-3 | 3,943,183-4 |
| 3,558,732 | 3,696,107 | 3,960,774 |
| 3,626,020 | 3,795,711 | 3,997,620 |
| 3,663,638 | 3,855,333 | 4,029,717 |
| 3,734,974 | 3,878,127 | 4,031,155 |
| 3,761,533 | 3,878,129 | 4,051,192 |
| 4,313,015 | 3,894,109 | 4,069,172 |

In these illustrative patents, particular zeolites may be used to selectively adsorb para-xylene from feed mixtures which contain several C-8 aromatic isomers; and in these patents the p-xylene is selectively adsorbed and is ultimately recovered as a tail-end or extract product while the remaining xylenes and ethylbenzene are recovered as front-end or raffinate components.

In other patents, typified by U.S. Pat. No. 3,997,619, there are disclosed processes for recovering ethylbenzene wherein this component is relatively unadsorbed and is thus recovered as high purity front-end product, the xylene isomers being recovered as tail-end products - this being effected by use of an adsorbent which is "all xylene" selective.

It is an object of this invention to provide a process for separating p-xylene as tail-end or extract product from a C-8 charge stream. Other objects will be apparent to those skilled in the art.

STATEMENT OF THE INVENTION

In accordance with certain of its aspects, this invention is directed to a process for separating para-xylene from a feed mixture containing C-8 aromatic hydrocarbons including para-xylene which comprises contacting said feed mixture in the presence of a desorbent with, as an adsorbent, a barium or barium/potassium exchanged high pressure zeolite HP, formed by ion exchange from a sodium HP aluminosilicate zeolite having a lattice constant of 25.02 Å–25.10 Å and a ratio of silicon atoms to aluminum atoms in the unit cell below 1.0 thereby selectively adsorbing para-xylene to the substantial exclusion of other C-8 atoms; and recovering said para-xylene as an extract stream.

In accordance with certain of its other aspects this invention is directed to a novel barium (or barium/potassium) synthetic crystalline aluminosilicate zeolite HP.

DESCRIPTION OF THE INVENTION

The charge mixtures which may be treated by the process of this invention include mixtures containing C-8 aromatic hydrocarbons including para-xylene. These mixtures, which contain substantial quantities of ethylbenzene and the xylene isomers, generally are produced by reforming and isomerization processes which are well known to the refining and petrochemical arts. In reforming processes, a naphtha feed may be contacted with a platinum-halogen-containing catalyst at severities selected to produce an effluent containing C-8 aromatic isomers. Generally the reformate is then fractionated to concentrate the C-8 aromatic isomers in a C-8 fraction. The C-8 aromatic isomers may then be further concentrated by solvent extraction processes. Xylene isomerization processes isomerize at isomerization conditions a xylene mixture which is deficient in one or more isomers to give an effluent containing approximately equilibrium quantities of the C-8 aromatic isomers. The equilibrium compositions of the xylene isomers and ethylbenzene at various temperatures are shown in the Table below.

TABLE
EQUILIBRIUM C-8 AROMATIC COMPOSITIONS*

| | Mole percent of isomers | | |
|---|---|---|---|
| Temperature °F. | 620 | 800 | 980 |
| Ethylbenzene | 6 | 8 | 11 |
| Para-xylene | 22 | 22 | 21 |
| Meta-xylene | 50 | 48 | 45 |
| Ortho-xylene | 22 | 28 | 23 |

*Based on API sources

Feed streams may contain ethylbenzene and any of the xylene isomers in addition to para-xylene. Extracted C-8 reformate fractions and isomerates from xylene isomerization processes containing all of the xylene isomers can be charged as feed streams. Feed streams include effluent streams from processes which have removed varying amounts of one or more xylene isomers or ethylbenzene. As an example, at least a portion of the ortho-xylene may have been previously removed by fractionation from a feed mixture containing the xylene isomers. Ortho-xylene has a boiling point of about 6° F. higher than that of the nearest other C-8 aromatic (meta-xylene) and hence can be removed as a bottoms products from ortho-xylene fractionator towers. The concentration of ortho-xylene in the effluent from this fractionation process which can be used as a feed stream may be less than the concentrations of either para-xylene or meta-xylene.

Ethylbenzene, which has a lower boiling point than any of the xylene isomers, may also be separated by distillation, preferably after removal of at least a portion of the ortho-xylene. The concentration of ethylbenzene in the effluent from this fractionation process which can be used as feed stream may be less than the concentrations of either para-xylene or meta-xylene. Removal of ethylbenzene and/or ortho-xylene from C-8 aromatic mixtures may be effected by distillation.

C-8 aromatic components, other than those desired as product, should be present in the feed stock at as low a concentration level as possible. Thus for para-xylene production, the content of meta-xylene, ortho-xylene, and ethylbenzene should be as low as possible. In practice, only ortho-xylene and ethylbenzene can be removed by distillation, so a charge stock containing a concentrate of meta-xylene and para-xylene would be typically available for production of either para-xylene or para-xylene and meta-xylene. It is to be noted that separation of ethylbenzene by distillation is expensive; and accordingly economic considerations may dictate that the feedstock would have been treated in manner to principally reduce the content of ortho-xylene.

In accordance with practice of the process of this invention, the feed mixture containing C-8 aromatic hydrocarbon including para-xylene may be contacted with, as an adsorbent, a barium or barium/potassium exchanged high pressure zeolite HP, thereby selectively adsorbing said para-xylene to the substantial exclusion of other isomers in said C-8 stream.

The synthetic crystalline aluminosilicate zeolite HP adsorbents which may be employed (in their Ba or Ba/K exchanged form) in practice of the process of this invention may include those derived by ion-exchanging the sodium HP zeolites prepared at high pressures at moderate temperatures and particularly characterized by a lattice constant of 25.02–25.10 Å and by a ratio of silicon atoms to aluminum atoms of below 1.0. Typical of the useful HP zeolites may be those prepared by ion-exchanging the NaHP zeolites of U.S. Pat. No. 4,289,740 which issued Sept. 15, 1981 to Texaco Inc. as assignee of John H. Estes or U.S. Pat. No. 4,306,962 which issued Dec. 22, 1981 to Texaco Inc. as assignee of John H. Estes.

The synthetic crystalline sodium aluminosilicate zeolite HP (NaHP zeolite) may be prepared by forming an aqueous gel containing sodium aluminosilicate ($Na_2O$-$SiO_2$-$Al_2O_3$) in amounts and ratios sufficient to yield a product zeolite having a ratio of silicon atoms to aluminum atoms of below 1.0, typically 0.8–1.0.

The mixture may preferably be aged at pressure above 20,000 psig. More preferably, aging is carried out at pressure above 40,000 psig. Although aging may be carried out at 20,000–80,000 psig, it is preferably effected at 20,000–60,000 psig, say 40,000–50,000 psig, commonly about 50,000 psig. Aging may be carried out at 50° F.–100° F., preferably 70° F. for 8–24 hours, preferably 16 hours.

The mixture, preferably after aging, is subjected to HP zeolite-forming pressure of 20,000–80,000 psig, preferably 20,000–60,000 psig, say 40,000–50,000 psig, commonly about 50,000 psig. Temperature of operation may be 150° F.–350° F., preferably 150° F.–250°, say 200° F. over 4–24 hours, preferably 8–12 hours, say 8 hours. In the preferred embodiment, the pressure will be the same in the aging step (if and when employed) as it is in the subsequent reaction step.

The typical HP zeolites obtained by recovery of the product from the reaction may have the following formula:

$$Na_a[(AlO_2)_a(SiO_2)_b] \cdot c\ H_2O$$

In this formula a plus b is 192. a is greater than 96 and preferably 97–103, commonly 97. In the formula, c is commonly 264.

A typical Na HP zeolite may have the formula:

$$Na_{97}[(AlO_2)_{97}(SiO_2)_{95}] \cdot 264\ H_2O$$

The NaHP zeolite so-prepared is commonly typified by a ratio of silicon atoms to aluminum atoms of below 1.0, preferably about 0.8–1, say 0.98 and by a lattice constant of 25.02–25.10 Å, say 25.03 Å.

Conversion of the NaHP zeolite to the BaHP zeolite may be effected by immersing the former in an excess of an aqueous solution of a water-soluble salt of barium - preferably barium acetate, barium formate, etc. at preferably ambient temperature of 60° F.–90° F., say 75° F.

for 0.5–4 hours, say 2 hours. The solution may be removed and the procedure repeated 3–5 times.

After 5 exchanges the barium is found to replace the sodium in amount of about 99 atom %.

Typical BaHP zeolites may include:

TABLE

| | |
|---|---|
| $Ba_{48.5}$ | $[(AlO_2)_{97}(SiO_2)_{95}] \cdot 264\ H_2O$ |
| $Ba_{49.7}$ | $[(AlO_2)_{99.7}(SiO_2)_{92.3}] \cdot 264\ H_2O$ |
| $Ba_{51.0}$ | $[(AlO_2)_{102}(SiO_2)_{90}] \cdot 264\ H_2O$ |

The preparation of the Ba/K exchanged zeolites may be effected by (1) exchanging potassium into the barium HP zeolite, (ii) exchanging barium into the potassium HP zeolite or (iii) simultaneously exchanging barium and potassium into the sodium zeolite. The Ba/K HP zeolite may also be prepared by equilibrating (e.g. in aqueous medium) BaHP and KHP zeolites.

Typical Ba/K zeolites may include:

TABLE

| | | |
|---|---|---|
| $Ba_{36.1}$ | $K_{25.1}$ | $[(AlO_2)_{97.5}(SiO_2)_{94.5}] \cdot 264\ H_2O$ |
| $Ba_{36.0}$ | $K_{25.0}$ | $[(AlO_2)_{97}(SiO_2)_{95}] \cdot 264\ H_2O$ |
| $Ba_{37.5}$ | $K_{25.0}$ | $[(AlO_2)_{100}(SiO_2)_{92}] \cdot 264\ H_2O$ |

The Ba or Ba/K exchanged zeolites commonly include less than about 40 atom %, preferably less than about 20 atom % of sodium.

The adsorbent can be contained in one or more chambers where through programmed flow into and out of the chamber, separation of the isomers is effected. Preferably in operation, fixed quantities of a charge stream and of a desorbent stream are admitted alternately to one end of a bed or column of zeolite; and effluent from the other end of the column is segregated into cuts. The bed may be operated in either up-flow or down-flow mode. Concentrations of individual charge components and of desorbent in effluent from the columns resulting from this operation vary with time (or quantity of total effluent). The resolution of components taking place in the column is characterized as cyclic, chromatographic, adsorptive separation where the cycle time is the interval between the start of introduction of corresponding successive portions of charge (or of desorbent) to the column, or their appearance in the effluent. Effluent from the column during each cycle is segregated into fractions, or cuts, which may include (1) a front end raffinate cut taken at the beginning of the cycle in which the less strongly adsorbed charge components are concentrated; (2) a back end or tail-end extract cut taken at the end of the cycle in which the most strongly adsorbed charge component (para-xylene) is concentrated to high purity relative to other charge components; (3) one or more intermediate cuts in which the back end product component is concentrated relative to other charge components, but at a lower purity level than in the product cut (such cuts may be recycled to the charge preparation operation to permit substantially complete recovery of product component in high purity). If desired, cut (3) may be combined with cut (1).

The cyclic process may be carried out either in the liquid phase or in the vapor phase. Liquid phase operation may be carried out at lower temperatures and may permit easier control of charge and cut points, but vapor phase operation is preferred because of the much greater separation efficiency afforded by this mode. Preferred conditions for the process of this invention in liquid phase operation will include temperatures within the range from about 100° F. to about 450° F. at pressures sufficient to maintain a liquid phase and to provide a driving force for moving fluid through the adsorbent bed, generally in the range from about atmospheric to about 500 psig. Preferred conditions for the process of this invention in vapor phase operation will include temperatures from about 290° F. to about 450° F. sufficient to maintain components in the vapor phase at pressures from about atmospheric to about 80 psig, the pressure preferably being the minimum required to drive fluid through the system.

In both liquid and vapor phase modes, operation is substantially isothermal; and pressure drop across the system is substantially constant, although some variation may occur during the course of a cycle. For minimum loss of product, the quantity of desorbent introduced for a given quantity of charge is sufficient to displace all charge components to an extent that the residual total charge component concentration in the effluent for a given cycle is very low, preferably below about 0.1%, before charge components from the following cycle start to appear. If less desorbent is used, some loss of product (para-xylene) into the raffinate cut (1) occurs. If more desorbent is used, separation is still achieved, but the cycle time and amount of desorbent to be removed from product fractions are unnecessarily increased. The quantity of charge introduced per cycle and the minimum desorbent: charge ratio for this quantity of charge are related to a number of factors including yield of pure para-xylene (as a percentage of paraxylene in the charge), adsorbent capacity, selectivity, and particle size, fluid flow rate, and particularly to charge composition and to column length. Preferred process design specifications are largely related to the cost of the absorbent bed per unit of pure product production rate and to the cost of separating desorbent from effluent fractions; both costs must be considered together.

The process of this invention may also be effected in a simulated moving bed countercurrent system. The operating principles and sequence of such a flow system are described in U.S. Pat. No. 2,985,589 issued to D. B. Broughton which patent is incorporated herein by specific reference thereto. This system may be operated in the liquid phase mode with the same zeolite adsorbent and in the same temperature and pressure ranges as those previously described for cyclic operation in the liquid phase mode. Para-xylene is recovered as a most strongly adsorbed, or extract product. Operation of a simulated moving bed countercurrent system in the vapor phase mode, while possible in principle, would be difficult to achieve in practice; so if the advantageous separation efficiency of the vapor phase mode is to be obtained, the cyclic operating procedure is preferred.

The desorbent materials which are used in the preferred processing schemes employed may vary depending on the type of operation employed. The term "desorbent material" as used herein means any fluid substance capable of removing a selectively adsorbed feed component from the adsorbent. In the swing-bed system, in which the selectively adsorbed feed component is removed from the adsorbent by a purge stream, desorbent materials comprising gaseous hydrocarbons such as methane, ethane, etc., or other types of gases such as nitrogen or hydrogen may be used at elevated temperatures or reduced pressures or both to effectively purge the adsorbed feed component from the adsorbent.

However, in adsorptive separation processes which employ zeolitic adsorbents and which are generally operated at substantially constant pressures and temperatures, the desorbent material relied upon must be judiciously selected to satisfy several criteria. First, the desorbent material must displace the desorbed feed component from the adsorbent with reasonable mass flow rates without itself being so strongly adsorbed as to unduly prevent charge components from displacing the desorbent material in a following adsorption cycle. Secondly, desorbent materials must be compatable with the particular adsorbent and the particular feed mixture. More specifically, they must not reduce or destroy the critical selectivity of the adsorbent for the components of the charge.

Desorbent materials to be used in the process of this invention should additionally be substances which are easily separable from the feed mixture that is passed into the process. Each of the effluent cuts in cyclic processes, and both raffinate and extract streams in simulated moving bed countercurrent processes, contain desorbent in admixture with charge components. Without a method such as distillation, for separating desorbent material from product, purity would be low; and consumption of desorbent in the process would be excessive. Any desorbent material used in this process will have a substantially different average boiling point from that of the feed mixture. The use of desorbent material having a substantially different average boiling point than that of the feed allows separation of desorbent material from feed components in the various effluent cuts or the extract and raffinate streams by fractionation thereby permitting reuse of desorbent material in the process. The term "substantially different" as used herein means that the difference between the average boiling points between the desorbent material and the feed mixture shall be at least 15° F. The boiling range of the desorbent material may be higher or lower than that of the feed mixture.

Among the desirable characteristics of an adsorbent are: adsorptive capacity for some quantity of an extract component per unit quantity of adsorbent; the selective adsorption of feed components with respect to one another such that a desired pure product component is adsorbed more strongly or less strongly than the other components; and sufficiently fast rates of adsorption and desorption of the extract components to and from the adsorbent.

Capacity of the adsorbent for adsorbing components of the separation system, including desorbent, is, of course, a necessity; without such capacity the adsorbent is useless for adsorptive separation. Increased capacity of a particular adsorbent makes it possible to increase the separation efficiency and thereby reduce the amount of adsorbent needed to effect separation of a particular feed mixture at a given product purity and yield. (Yield is defined as the fraction of a feed component recovered as pure product.) A reduction in the amount of adsorbent required for a specific adsorptive separation reduces the cost of the separation process. It is important that the good initial capacity of the adsorbent be maintained during actual use in the separation process over some economically desirable life.

The second necessary adsorbent characteristic is the ability of the adsorbent to separate components of the feed; or, in other words, that the adsorbent possess adsorptive selectivity for one component as compared to another component. Relative selectivity can be expressed not only for one feed component as compared to another but can also be expressed between any feed mixture component nd the desorbent material. The selectivity as used throughout this specification is defined as the ratio of concentrations of the two components in the adsorbed phase divided by the ratio of concentrations of the same two components in the unadsorbed phase at equilibrium conditions.

Determining these adsorbent characteristics, particularly capacity and selectivities for charge and desorbent components, is essential for developing an adsorptive separation system for recovering specific pure components from mixtures with difficultly separable substances, such as isomers of the desired products. Further, once such a system is established, a convenient test method is required for determining that subsequent batches of adsorbent are equivalent to the original adsorbent or fall within a satisfactory range.

A convenient and effective procedure for accomplishing these objectives comprises the steps of:

(1) Combining a suitably prepared (i.e. dried to a specific moisture level) adsorbent sample with a test mixture of test components, which may include components of a mixture to be separated, desorbent materials, and adsorbent modifiers, in the presence of a reference component which is essentially unadsorbed and essentially inert, in the presence of strongly adsorbed test components. For determining adsorption equilibria for mixtures of aromatic hydrocarbons, paraffinic or cycloparaffinic hydrocarbons are suitable reference components. A particularly suitable reference component is cyclohexane.

(2) Equilibrating the solid-liquid mixture with suitable agitation in a sealed vessel at a convenient temperature, which may be room temperature.

(3) Separating equilibrated liquid from solid adsorbent (e.g. by centrifuging), sampling the liquid, and analyzing the liquid by a suitable procedure (e.g. gas chromatography) for determining the concentration of each of the components present.

(4) From the known weight and composition of the test component-reference component test mixture charged, and composition of equilibrium liquid, calculating the quantity of each test component in the equilibrium liquid using as a basis for such calculation the originally charged weight of inert (non-adsorbed) reference component in both the test liquid and equilibrium liquid.

(5) By difference, from the calculated weight of each component in the equilibrium liquid and the known amount of each component in the charge, calculating the weight of each test component adsorbed.

(6) From the weight of adsorbent charged and the weights of test components adsorbed, calculating the capacity of the adsorbent for the test components and the composition of the adsorbed phase.

(7) From the calculated composition of the adsorbed phase and the composition of the equilibrium liquid phase obtained by analysis, determining selectivity of the adsorbent for any pair of test components.

The method may be used to screen separation systems prior to column operation; separations obtained from column operation at elevated temperature are found to correspond to those expected from the adsorbent characteristics determined by the test method. It may be used to determine variation of selectivity with fluid phase composition, a relationship not readily obtainable from other methods for estimating adsorbent selectivities. It may be used to determine the effects of components added to modify the selectivity characteristics of original adsorbents or to determine the effects of impurities (such as water) which may be present in charge or desorbent streams, particularly in commercial operation. It may be used to determine variations of adsorbent capacity, which may be due to occluded solid material in the pores or to variations in the quantity of binder used, which do not appreciably affect adsorbent selectivity. It may be used as an adsorbent specification test where specific values or ranges of capacity and selectivity for specific test components at particular concentration levels are specified. It may be used to select suitable desorbent materials. It may also be used as a control test during manufacture of zeolites.

The preferred desorbent may be toluene. Benzene or diethyl benzenes may be employed as desorbent.

In isothermal, isobaric, operation of the process of this invention, desorbent materials comprising monocyclic aromatic hydrocarbons are particularly effective. Specifically, desorbent materials comprising toluene are preferred for this type of operation.

In operation of the process of this invention in the cyclic, liquid phase mode, the zeolite, packed in the adsorption column, is flooded with desorbent toluene which is passed downwardly through the adsorbent bed at a flow rate of 0.1–6, say about 2 gallons per minute per square foot of column cross section. Periodically the flow of toluene is interrupted and a portion of charge is introduced at about the same flow rate. As the effluent is monitored (by gas chromatography, for example), toluene desorbent is first observed.

When the first non-para-xylene C-8 component shows, the cycle is considered started.

It is possible to collect incremental portions of effluent (over equal time increments), but one preferred operation is carried out by collecting the entire quantity of para-xylene-lean raffinate stream in one aliquot. Depending on the details of the downstream processing facility, there may be recovered a second stream which is rich in para-xylene although it is of a purity less than that of the extract stream. A tail or extract product stream may be recovered containing substantially pure para-xylene.

Each of these effluent streams may be separated, as by distillation, from the toluene which may be recycled.

Operation in the vapor phase is comparable. The adsorbent may be loaded with toluene in liquid phase ab initio. The system is then heated to e.g. 340° F. and liquid displaced from the column by passing vapor phase toluene desorbent downwardly through the adsorbent bed. Charge is introduced periodically in the vapor phase. The effluent is condensed and collected in desired increments followed by recovery of the desired high purity para-xylene from toluene in the extract product.

In the process of this invention, it may be desired to maintain a level of adsorbed water in the zeolite to achieve optimum separation characteristics. When operating in the liquid phase mode, regulation of adsorbed water may be achieved by controlling the content of dissolved water in the liquid streams (desorbent and charge) entering the adsorption column. Such control may be expensive, involving drying of the liquid streams if they contain too much water, or adding water to maintain precise, low level concentrations below the saturation point of the hydrocarbons. In vapor phase operation, water content of the adsorbent is normally extremely low, even with charge and desorbent streams which have been substantially saturated with water while in the liquid phase at ambient conditions. To maintain a higher water content level in the adsorbent during vapor phase operations, water (preferably as steam) may be injected continuously at the column inlet to maintain a desired partial pressure of water in the column. Control by this means in vapor phase operation is appreciably simpler than control of liquid phase hydrocarbon water content.

Although the process of this invention may function when the system (i.e. the zeolite) contains little or no water, it is preferred that water be present in amount of 1%-8%, more preferably 5%-7%, say about 5.6 w %. Water content is measured as loss on ignition. The water may be measured (as loss on ignition at 1000° F.) before the zeolite is placed in the column; and constancy is insured by measuring the water content of the charge to the column and the effluent therefrom.

ADVANTAGES OF THE INVENTION

It is a feature of the process of this invention that it is characterized by many advantages including the following:
(i) It permits attainment of high purity para-xylene under conditions of high selectivity;
(ii) when operating in vapor phase in particular, it permits convenient control of the zeolite water content by addition of water or steam at the inlet of the adsorption chamber.

The novel product synthetic crystalline barium or barium/potassium aluminosilicate zeolite HP of this invention may find use in the process of this invention for recovering para-xylene extract from a C-8 hydrocarbon stream or in a wide variety of other processes including catalytic cracking of hydrocarbons, etc.

DESCRIPTION OF THE DRAWINGS

FIG. 1 presents a schematic process flow sheet showing operation according to the best mode presently known of carrying out the process of this invention.

DESCRIPTION OF PREFERRED EMBODIMENTS

Practice of the novel process of this invention may be apparent to those skilled in the art from the following description of various embodiments wherein as elsewhere in the description, all parts are parts by weight unless otherwise specified.

EXAMPLE I

This example sets forth procedures for preparing a Ba HP zeolite and a Ba/K HP zeolite which are typical of those which may be used in the process of this invention.

200 grams PQN grade sodium silicate (36.5 wt. % $Na_2Si_4O_9$) was diluted to 400 cc with distilled water. 282 grams of Nalco #2 stabilized sodium aluminate ($Na_2O/Al_2O_3 = 1.45/1$) was diluted to 400 cc with distilled water. The two solutions were mixed rapidly to obtain a uniform consistency. Then 42 cc of commercial concentrated hydrochloric acid (12 N) diluted to 100 cc were added and the mixture blended until uniform. The gel had a Si/Al atom ratio of 0.79. The gel was charged to the high pressure vessel, aged for 20 hours at room temperature under 50,000 psig hydrostatic pressure, then heated to 200° F. (93.3° C.) for 6 hours. An Na zeolite HP product was collected by filtration and washed with one liter of distilled water. The product yield was 134 grams. X-ray diffraction measurements showed that the HP zeolite had a lattice constant of 25.07 A and a silicon to aluminum atom ratio of 0.895.

25 grams of Na HP zeolite was immersed in 200 ml of 1N barium chloride solution and this was permitted to stand for 0.5 hours at 160° F. The liquid was poured off and the procedure repeated five times with fresh solution. Between exchanges, the zeolite was washed with 500 ml of distilled water; after the last exchange, it was washed with 1000 ml of distilled water. In the resulting Ba HP zeolite, it was found that sodium had been replaced by barium.

An aliquot (25 grams) of the Na HP zeolite was immersed in 200 ml of 1.0N potassium chloride at 160° F. for 0.5 hours. The liquid was poured off and the procedure repeated five times with fresh solution. In the resulting KHP zeolite, it was found that potassium had replaced the sodium originally present.

The Ba/K exchanged NaHP zeolite was prepared by mixing 10 g BaHP and 4 g KHP and suspending the mixture in 100 g of distilled water at 225° F. for 48 hours during which time equilibration was effected. The x-ray pattern of the Ba/KHP zeolite is different from that of the BaHP or the KHP prepared by single exchange.

EXAMPLES II-1 TO II-13

In these examples, equilibrium data were obtained for adsorption of C-8 aromatic isomers on various zeolite samples.

Adsorbents used were dried in a tube furnace under a flow of dry nitrogen, then were loaded into previously weighed glass ampoules in a nitrogen-flushed dry box. In some cases, a known quantity of water was added to the dried adsorbent before it was loaded into the ampoule. The weight of adsorbent was determined, then a quantity of previously prepared charge mixture was introduced, the ampoule was chilled in liquid nitrogen, evacuated, sealed, and weighed to determine the weight of charge mixture. Charge mixtures were made up with known amounts of C-8 aromatics, and inert reference component (cyclohexane). The ratio of reference component to total C-8 aromatics (and desorbent, if present) was generally 1.0–1.5:1. The weight ratio of liquid charge to adsorbent was normally about 2 and the quantity of adsorbent used was generally about 1 gram.

Loaded ampoules were agitated on a shaker table at a temperature of about 75° F. for an equilibration period. Typically the equilibration period was about one week up to several months. After equilibration, ampoules were usually centrifuged to facilitate separation of liquid from absorbent, then the liquid was sampled and analyzed by gas chromatography. Replicate analyses were usually obtained and analyses of samples of charge liquid (retained in sealed ampoules) were usually carried out at the same time.

The quantity of each C-8 aromatic (and desorbent, if present) in the equilibrium liquid was calculated from the GC analysis and known weight of reference component in the charge as Wt. Component (equil.) =

$$\frac{\% \text{ Component (Equil.)}}{\% \text{ Reference (Equil.)}} \times \text{Wt. Reference (Charge)}$$

The corresponding quantity of component adsorbed per unit weight of adsorbent charged was calculated as:

$$\frac{\text{Wt. Component Adsorbed}}{\text{Wt. Adsorbent}} =$$

$$\frac{\text{Wt. Component (Equil.)} - \text{Wt. Component (Charge)}}{\text{Wt. Adsorbent}}$$

Total capacity of the adsorbent is the sum of individual component adsorption values. Composition of the C-8 aromatics (and desorbent, if present) in the adsorbed phase is calculated from the individual component adsorption values.

The selectivity with which an adsorbent adsorbs one component relative to another is a measure of its separation capability. Selectivity factors alpha ($\alpha$) are commonly used as measures of adsorbent selectivity between components of a mixture. Selectivity between any two components is defined as:

$$\alpha = \frac{\left(\frac{\text{Conc. Component 1}}{\text{Conc. Component 2}}\right) \text{Adsorbed Phase}}{\left(\frac{\text{Conc. Component 1}}{\text{Conc. Component 2}}\right) \text{Fluid Phase}}$$

Thus $\alpha$ will be greater than 1.0 if component 1 is more strongly adsorbed than component 2. With a multi-component mixture it is convenient to express selectivities of the components relative to a particular component of the mixture.

Selectivity factors in the present examples are calculated from the composition of the adsorbed phase, determined as described above, and the composition of the equilibrium liquid determined by gas chromatography.

In each of Examples II-1 through II-13, a charge liquid containing equal portions by weight of ethylbenzene, p-xylene, m-xylene, and o-xylene (plus cyclohexane reference component) was equilibrated against a designated zeolite.

The following table sets forth equilibrium data at 75° F. on various zeolites. Tests were carried out on zeolite samples dried at 700° F.–800° F. without further treatment, unless otherwise noted. Capacity of the zeolite (total and C-8) is expressed as weight of adsorbed component(s) as a percentage of the weight of adsorbent.

There are tabulated the selectivity (alpha) of (i) EB (ethylbenzene) with respect to p-xylene; (ii) P-X (para-xylene) with respect to p-xylene, which is of course 1.00, included for reference; (iii) M-X (meta-xylene) with respect to p-xylene; and (iv) O-X (ortho-xylene) with respect to p-xylene.

The Ba-exchanged zeolites in Examples 3-4 were prepared from a different batch of Na-HP zeolite than those of Examples 5-12. The Ba zeolites in Examples 5-6 and those of Examples 7-12 were prepared in two separate ion exchange treatments.

TABLE
ION-EXCHANGED HP ZEOLITES

| Example | Cation | LOI[1] | LOI[2] | Capacity | Selectivity EB | M | P | O |
|---|---|---|---|---|---|---|---|---|
| II-1* | Na | 2.2 | 0.9 | 20.7 | 1.38 | 1.00 | 1.00 | 0.99 |
| 2* | K | 1.6 | 1.0 | 15.4 | 1.46 | 0.49 | 1.00 | 0.74 |
| 3 | Ba | 2.2 | 0.8 | 10.6 | 0.22 | 0.71 | 1.00 | 0.45 |
| 4 | Ba | 2.2 | 0.8 | 11.1 | 0.26 | 0.71 | 1.00 | 0.46 |
| 5 | Ba | 5.6 | 1.2 | 13.3 | 0.24 | 0.77 | 1.00 | 0.44 |
| 6 | Ba | 5.6 | 1.2 | 13.8 | 0.23 | 0.78 | 1.00 | 0.44 |
| 7 | Ba | 7.7 | 3.1 | 13.4 | 0.24 | 0.37 | 1.00 | 0.23 |
| 8 | Ba | 7.7 | 3.1 | 11.3 | 0.20 | 0.29 | 1.00 | 0.15 |
| 9 | Ba | 9.6[a] | 5.6[a] | 10.2 | 0.27 | 0.25 | 1.00 | 0.13 |
| 10 | Ba | 9.6[a] | 5.6[a] | 9.1 | 0.23 | 0.19 | 1.00 | 0.07 |
| 11 | Ba | 11.3[a] | 7.5[a] | 9.1 | 0.29 | 0.19 | 1.00 | 0.12 |
| 12 | Ba | 11.3[a] | 7.5[a] | 8.3 | 0.26 | 0.14 | 1.00 | 0.08 |
| 13 | Ba/K | 3.8 | 1.1 | 12.4 | 0.80 | 0.40 | 1.00 | 0.59 |

[1]Loss-on-ignition at 1800° F., %
[2]Loss-on-ignition at 1000° F. %
[a]Water added to dried zeolite
*Control Example From the above table, it will be apparent that control Examples II-1* and II-2* using NaHP and KHP zeolites do not permit ready separation of para-xylene. Using NaHP (Ex. II-1*) the selectivity of para-xylene and meta-xylene are identical and are indistinguisable from that of ortho-xylene. With KHP, the para-xylene would undesirably be recovered as a middle cut.

In Examples II-3 to 12, using different samples of Ba HP zeolite, the selectivity of para-xylene is sufficiently greater than that of the other isomers to permit ready separation. As the water content of the zeolite increases, particularly above a level corresponding to a loss-on-ignition at 1000° F. of 5.6%, the selectivity of para-xylene relative to both meta-xylene and ortho-xylene improves markedly. The selectivity of para-xylene relative to ethylbenzene remains fairly constant over the entire range of water contents, becoming only slightly less favorable at high water contents.

It will also be apparent from the above table that use of the preferred BaHP zeolite having a water content of 5.6 w % (as determined by LOI at 1000° F.) gives e.g. a selectivity of EB/PX of 0.23 whereas prior art discloses typically that (at column 10) of U.S. Pat. No. 3,734,974 show preferred operation using X zeolite of 2.4 w % water content giving selectivity of EB/PX of 0.47 (i.e. 1/2.13). Thus the instant process permits attainment of selectivity which is twice that of the prior art.

EXAMPLE III

This examples sets forth a process flow plan according to which this invention may be carried out using the best mode presently known.

In this embodiment the charge C-8 stream from which it is desired to recover para-xylene contains:

| Component | w % |
|---|---|
| ethylbenzene | 20.0 |
| para-xylene | 20.3 |
| meta-xylene | 39.7 |
| ortho-xylene | 20.0 |

This stream is admitted through line 10 to distillation operation 11 from which ortho-xylene may be recovered as bottoms through line 12. Overhead in line 13 typically contains:

| Component | w % |
|---|---|
| ethylbenzene | 24.7 |
| para-xylene | 25.0 |
| meta-xylene | 49.0 |

| Component | w % |
|---|---|
| ortho-xylene | 1.3 |

Overhead in line 13 is passed through heat exchanger 14 wherein it is vaporized at 340° F. This vapor is passed through line 15 to adsorption operation 16 which is a column loaded with Ba HP zeolite containing about 6 w % water as evidenced by a loss on ignition at 1000° F.

Toluene desorbent is admitted through line 17 and 18 to heat exchanger 19 (which vaporizes toluene to a temperature of 340° F.); and the vaporized toluene then passes to adsorption operation 16. At least a portion of the toluene may be recycled toluene from manifold 20.

Toluene is passed through the adsorption bed at a flow rate equivalent to 0.5 gallons of liquid toluene (measured at room temperature) per minute per square foot of column cross-section. Periodically the flow of toluene vapor to the column from line 18 is interrupted and C-8 charge in the vapor phase at 340° F. is admitted to the top of the column and is passed through the adsorption bed at a flow rate equivalent to 0.5 gallons of liquid charge per minute per square foot of column cross-section.

Simultaneously there is introduced through line 21 to the top of column 16, water vapor at 340° F. at a rate to provide a partial pressure of water in the column sufficient to maintain the level of water in the Ba HP zeolite at 6%.

The interval between sequential introduction of charge (or of toluene) comprises a single cycle. In each cycle the first or raffinate cut recovered through line 22 may be condensed in exchanger 23 and passed through line 24. Water contained in this cut is schematically shown as being withdrawn through line 25. Water may commonly be separated as by settling or passage through a drier. The stream in line 24 is passed through heat exchanger 26 to distillation operation 27. Overhead recovered in line 28 may include desorbent toluene, which may be recycled through manifold 20. Bottoms recovered through line 29 may typically contain the following as a reject stream:

| Component | w % |
|---|---|
| ethylbenzene | 31.2 |
| para-xylene | 1.9 |
| meta-xylene | 64.9 |
| ortho-xylene | 2.0 |

The second cut recovered from adsorption operation 16 may be withdrawn through 30 and subjected to water-separation via line 31 and then passed through heat exchanger 32 to distillation operation 33. Toluene recovered as overhead through line 34 may be recycled through manifold 20. Bottoms recovered through line 35 may contain the following:

| Component | w % |
|---|---|
| ethylbenzene | 26.7 |
| para-xylene | 33.3 |
| meta-xylene | 40.0 |
| ortho-xylene | — |

The third or extract cut recovered from adsorption operation 16 may be withdrawn through line 36 and subjected to water-separation via line 37 and then passed through heat exchanger 38 to distillation operation 39. Toluene, recovered as overhead through line 40, may be recycled through manifold 20. Bottoms recovered through line 41 may be a high purity para-xylene containing:

| Component | w % |
|---|---|
| ethylbenzene | 0.2 |
| para-xylene | 99.5 |
| meta-xylene | 0.3 |
| ortho-xylene | — |

Although this invention has been illustrated by reference to specific embodiments, it will be apparent to those skilled in the art that various changes and modifications may be made which clearly fall within the scope of this invention.

I claim

1. Synthetic crystalline barium aluminosilicate zeolite HP.

2. Synthetic crystalline barium aluminosilicate zeolite HP having an atom ratio of silicon to aluminum in the unit cell below 1.0.

3. Synthetic crystalline barium aluminosilicate zeolite HP having an atom ratio of silicon to aluminum in the unit cell below 1.0 prepared by the process which comprises exchanging a synthetic crystalline sodium aluminosilicate zeolite HP with barium thereby forming product synthetic crystalline barium aluminosilicate zeolite HP; and recovering said product synthetic crystalline barium aluminosilicate zeolite HP.

4. Synthetic crystalline barium/potassium aluminosilicate HP.

5. Synthetic crystalline barium/potassium aluminosilicate HP having an atom ratio of silicon to aluminum in the unit cell below 1.0.

6. Synthetic crystalline barium/potassium aluminosilicate HP having an atom ratio of silicon to aluminum in the unit cell below 1.0 prepared by the process which comprises exchanging a synthetic crystalline sodium aluminosilicate zeolite HP with barium and potassium thereby forming product synthetic crystalline barium/potassium aluminosilicate zeolite HP; and recovering product synthetic crystalline barium/potassium aluminosilicate zeolite HP.

7. The method of preparing a product synthetic crystalline barium aluminosilicate zeolite HP which comprises exchanging a synthetic crystalline sodium aluminosilicate zeolite HP with barium thereby forming product synthetic crystalline barium aluminosilicate zeolite HP; and recovering said product synthetic crystalline barium aluminosilicate zeolite HP.

8. The method of preparing a product synthetic crystalline barium/potassium aluminosilicate zeolite HP which comprises exchanging a synthetic crystalline sodium aluminosilicate zeolite HP with barium and potassium thereby forming product synthetic crystalline barium/potassium aluminosilicate zeolite HP; and recovering said product synthetic crystalline barium/potassium aluminosilicate zeolite HP.

* * * * *